United States Patent Office 3,557,197
Patented Jan. 19, 1971

3,557,197
RADIOPAQUE COMPOUNDS
Ernst Felder and Davide Pitre, Milan, Italy, assignors to Bracco Industria Chimica, Società per Azioni, Milan, Italy
No Drawing. Filed Apr. 7, 1969, Ser. No. 814,176
Claims priority, application Switzerland, May 2, 1968, 6,626/68
Int. Cl. C07c *103/32*
U.S. Cl. 260—519                 12 Claims ABSTRACT OF THE DISCLOSURE
Radiopaque compounds of the formula

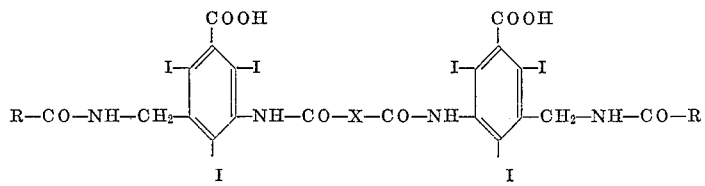

are readily converted to their water-soluble salts with sodium, lithium, calcium, magnesium, and the alkanolamines generally used in galenic pharmacy, and the solutions are good contrast media for intravenous injection in cholecystography, and partly also in angiography. In the formula, X is alkylene or oxa-alkylene having 4–10 carbon atoms, and R is lower alkyl.

This invention relates to X-ray contrast media, and particularly to contrast media for parenteral application in cholecystography.

It has been known for some time that organic compounds containing much iodine may be useful for visualizing the gall bladder under conditions of X-ray examination. Some of the compounds proposed heretofore have to be applied orally. They are resorbed from the intestinal tract only to a small extent so that the density of the images produced is not always satisfactory, and they are sufficiently toxic not to permit this shortcoming to be overcome by higher dosage rates.

The contrast media employed clinically heretofore by intravenous injection cause occasional lethal accidents (La Radiologia Medica, vol. LII, July 1966, pages 626–657). They are not as well tolerated as contrast agents now employed in urography and in visualizing blood vessels.

The object of the invention is the provision of better contrast media suitable for intravenous application for cholecystography.

We have found that 3-acylaminomethyl-5-carboxy-2,4,6-triiodoanilides of the formula

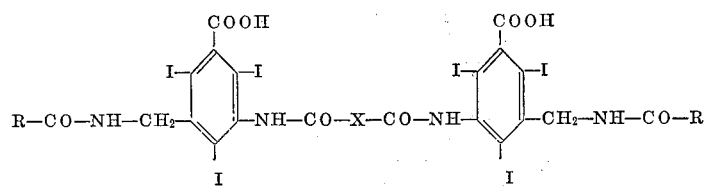

are superior contrast media for cholecystography. In the formula, X is alkylene or oxaalkylene having 4–10 carbon atoms, and R is lower alkyl. The free acids of the above formula are readily soluble in aqueous solutions of metal hydroxides and amines which are physiologicaly tolerated and the resulting concentrated solutions of the metal or amine salts may be injected intravenously. Some of the compounds of the above formula are also suitable for visualizing blood vessels, as in angiography.

As is necessary for good contrast agents to be employed in cholecystography, the compounds of the invention are secreted preferentially with the bile, and therefore accumulate in the gall bladder. Moreover, their toxicity is low, and they are well tolerated as compared to known clinical use for cholecystography.

Relevant properties of compounds of this invention and of known compounds are listed for comparison in the following Tables I to IV. In these tables, and throughout this specification, the compounds are identified by capital letters for brevity, as follows:

A: Pimelic acid bis-(3-acetylaminomethyl-5-carboxy-2,4,6-triiodoanilide)
B: Suberic acid bis-(3-acetylaminomethyl-5-carboxy-2,4,6-triiodoanilide)
C: Azelaic acid bis-(3-acetylaminomethyl-5-carboxy-2,4,6-triiodoanilide)
D: Sebacic acid bis-(3-acetylaminomethyl-5-carboxy-2,4,6-triiodoanilide)
E: Pimelic acid bis-(3-propionylaminomethyl-5-carboxy-2,4,6-triiodoanilide)
F: Suberic acid bis-(3-propionylaminomethyl-5-carboxy-2,4,6-triiodoanilide)
G: Azelaic acid bis-(3-propionylaminomethyl-5-carboxy-2,4,6-triiodoanilide)
H: Sebacic acid bis-(3-propionylaminomethyl-5-carboxy-2,4,6-triiodoanilide)
I: Pimelic acid bis-(3-butyrylaminomethyl-5-carboxy-2,4,6-triiodoanilide)
K: 4,7,10,13-tetraoxahexadecane-1,16-dioic acid bis-(3-acetylaminomethyl-5-carboxy-2,4,6-triiodoanilide)
L: Adipic acid bis-(3-carboxy-2,4,6-triiodoanilide) (Iodipamide)
M: Diglycolic acid bis-(3-carboxy-2,4,6-triiodoanilide) (ioglycamic acid)
N: Adipic acid bis-(3-amino-5-carboxy-2,4,6-triiodoanilide) (U.S. Pat. 3,306,927, Example 1)
O: 2-methyladipic acid bis-(3-acetylaminomethyl-5-carboxy-2,4,6-triiodoanilide)
P: 4,7-dioxadecane-1,10-dioic acid bis-(3-acetylaminomethyl-5-carboxy-2,4,6-triiodoanilide)
Q: 4,7,10-trioxatridecane-1,13-dioic acid bis-(3-acetylaminomethyl-5-carboxy-2,4,6-triiodoanilide)
R: 3,5-bis-(acetylamino)-2,4,6-triiodobenzoic acid.

Table I lists the toxicity of the above compounds A–N to mice as $DL_{50}$ in mg./kg. after intravenous application of aqueous solutions. For most of the compounds, it also lists the percent fraction of the compound found in the bile and in the urine respectively three hours after intravenous injection to rabbits at a rate of 100 mg./kg. Ultimately, the ratio of the percentage figures is given.

As is evident from Table I, the toxicity of the compounds of the invention is as low as or lower than the toxicity of the known contrast medium which is best in this respect, and the compounds of the invention tend to accumulate in the bile to a much greater extent than any of the known compounds. The toxicity values for some compounds of the invention listed below are closely similar to the toxicities of good known contrast media for urography and angiography.

TABLE I

| Compound: | Toxicity, $DL_{50}$, mg./kg. | Secretion, percent Bile | Secretion, percent Urine | Secretion ratio, bile/urine |
|---|---|---|---|---|
| A | 10,000 | 39 | 18 | 2.2 |
| B | 7,000 | 36 | 17 | 2.1 |
| C | 6,550 | 56 | 8 | 7 |
| D | 4,900 | 46 | 10 | 4.6 |
| E | 8,050 | 65 | 19 | 3.4 |
| F | 5,100 | 57 | 15 | 3.8 |
| G | 6,400 | 35 | 13 | 2.7 |
| H | 4,000 | 68 | 15 | 4.5 |
| I | ¹5,000 | 70 | 14 | 5 |
| K | 8,000 | | | |
| L | 2,380 | 37 | 38 | 0.98 |
| M | 3,750 | 30 | 41 | 0.73 |
| N | ¹5,000 | 20 | 28 | 0.71 |

¹ About.

The contrast obtained in radiographs taken on the gall bladder and bile ducts of dogs and/or cats with contrast media of the invention and known media is shown in Table II which lists cholecystographic indices determined by the method of Hoppe (see Margolin et al., J. Am. Pharm. Assn. 42 (1953) 476–481). Each listed value is based on averages of 2 to 4 determinations.

Notes (1) dog
(2) cat
(a) 100 mg. tested compound per kg., intravenous
(b) 165.6 mg. organically bound iodine per kg., intravenous
(c) 165.6 mg. iodine per kg. per fusion (4 hrs.) intravenous

TABLE II

| Compound: | Note | 1 | 2 | 4 | 5 | 6 | 8 | 24 |
|---|---|---|---|---|---|---|---|---|
| A | 2/a | 1 | 1.5 | 1.5 | | 2.5 | 2.5 | |
| B | 1/a | 2 | 2.25 | 2 | | 2 | 1.25 | |
| C | 1/b | 1.5 | 1.75 | 2.5 | | 3 | | 1.75 |
|   | 1/c | | | 3.25 | 3.8 | 3.5 | 3.5 | 1.8 |
| E | 1/a | 2 | 2.3 | 2 | | 1.75 | 1.5 | 1 |
|   | 1/b | 2 | 2.5 | 3 | | 3.5 | 3.5 | 1.5 |
|   | 1/c | | | 3.5 | 3.5 | 3.75 | 3.75 | 3 |
| F | 1/a | 1 | 1.75 | 1.75 | | 2 | 2.25 | 1.5 |
|   | 1/c | | | 3 | 3 | 2.5 | 2.5 | 2 |
| G | 1/a | 1.75 | 1.75 | 2 | | 2.5 | 2.5 | 0.5 |
|   | 1/b | 1.25 | 2 | 3 | | 3.5 | 3.5 | |
|   | 1/c | | | 3.25 | 3.25 | 3.25 | 3.5 | 2 |
| H | 1/a | 0.5 | 1.25 | 1.5 | | 2 | 2 | 1 |
|   | 1/b | 2.5 | 3 | 3.5 | | 4 | 4 | 3.5 |
| I | 1/a | 0.5 | 1.25 | 1.5 | | 2 | 2 | 1 |
|   | 2/a | 0.75 | 1.5 | 1.75 | | 1.75 | 1.75 | |
|   | 1/c | | | 3.75 | 3.75 | 3.75 | 3.75 | 2.5 |
| K | 1/a | 1.75 | 2.5 | 2.8 | | 2.5 | 2.25 | |
|   | 1/b | 2 | 2 | 2.5 | | 2.5 | 2 | 0.5 |
|   | 1/c | | | 2 | 2 | 2 | 2.5 | |
| M | 1/a | 0.5 | 1 | 1 | | 1 | 1.2 | 0.5 |

Compounds O, P, and Q are particularly low in toxicity and are excreted to a substantial extent with the urine, thus making them also suitable for angiography, as is evident from Table III which shows comparison values obtained under identical conditions with these compounds of the invention and the known Compound R which has been employed in angiography. The data in Table III correspond to those in Table I.

TABLE III

| Compound: | Toxicity $DL_{50}$, mg./kg. | Excretion ratio, bile/urine |
|---|---|---|
| O | 11,100 | 0.59 |
| P | 11,100 | 0.62 |
| Q | 10,000+ | 0.76 |
| R | 9,600 | ≪0.5 |

All sodium and lithium salts of the compounds represented by the above formula are readily soluble in water, and so are the salts of the physiologically tolerated amines which are commonly employed as cationic moieties with pharmaceutically effective anions, more specifically the alkanolamines such as N-methylglucamine, diethanolamine, morpholine, and the like.

The compounds of the invention are readily prepared by reacting a 3-acylaminomethyl-5-amino-2,4,6-triiodobenzoic acid of the formula

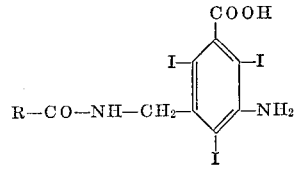

at a mole ratio of approximately 2 to 1 with a reactive derivative of a dicarboxylic acid of the formula

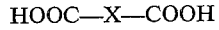

wherein X and R represent the radicals set forth above. The free acids so obtained are made water soluble by converting them into water-soluble salts thereof with a physiologically tolerated metal or amine. Such metals, in addition to the sodium and lithium referred to above, may also include calcium and magnesium.

The acyl halides of the afore-mentioned dicarboxylic acids, more particularly the dichlorides are generally applicable for the preparation of the compounds, but it is also possible to use mixed anhydrides, such as those with acids of phosphorus, for example acyl phosphites, with hydrogen azide, with other carboxylic acids, or with semi-esters of carbonic acid. Reactive esters, such as esterchlorides may also be employed. The reaction takes place readily when the mixture of the reactants is held for a sufficient time at a temperature between 20° C. and 250° C. with or without an inert solvent for better control of the rate of reaction.

The following examples are further illustrative of this invention, but it will be understood that the invention is not limited to the examples.

EXAMPLE 1

Pimelic acid bis-(3-acetylaminomethyl-5-carboxy-2,4,6-triiodoanilide)

4.1 pimelyl dichloride (heptanedioyl dichloride) were added drop by drop over a period of ten minutes to a solution of 23.45 g. 5-amino-3-acetylaminomethyl-2,4,6-triiodobenzoic acid in 40 ml. dimethylacetamide. The reaction solution so obtained was stirred for three hours at 90° C., cooled to ambient temperature, and poured into 400 ml. water. The precipitate formed was dissolved in dilute sodium hydroxide solution and reprecipitated with hydrochloric acid. It was then extracted with 100 ml. boiling ethanol, and the residue consisting of crude Compound A and insoluble in ethanol weighed 16.6 g. (64.2% yield) and had a melting point of 233° to 238° C.

It was further purified by dissolution in a methanol solution of cyclohexylamine, and precipitation of a purified cyclohexylamine salt of Compound A with isopropanol. The salt was decomposed with hydrochloric acid. The pure Compound A was obtained in crystalline form having a melting point of 237° to 240° C.

A sample was dried for three hours at 110° C., 0.2 mm. Hg, to remove crystal water, and was subjected to elementary analysis.

Calculated for $C_{27}H_{26}I_6N_4O_8$: 25.02% C; 57.76% I. Found: 25.07% C; 57.66% I.

An $R_f$ value of 0.46 was obtained in a thin layer chromatogram on silica gel with butanol/acetic acid/water 3:2:1. Silica gel Merck GF 524 was used in all these examples.

Compound A is insoluble in water and chloroform, and only very sparingly soluble in boiling methanol and ethanol. The sodium and N-methylglucamine salts are soluble in approximately equal weights of water at 20°.

EXAMPLE 2

Suberic acid bis-(3-acetylaminomethyl-5-carboxy-2,4,6-triiodoanilide)

Compound B was prepared in a manner analogous to the procedure of Example 1 from 23.45 g. 5-amino-3-acetylaminomethyl-2,4,6-triiodo-benzoic acid in 40 ml. dimethylacetamide and 5.05 g. suberyl dichloride (octanedioyl dichloride) at 95° C. in three hours, whereby 17.3 g. Compound B (66% yield) of M.P. 230°–235° C. were obtained as the monohydrate having an equivalent weight of 662, whereas an equivalent weight of 664 was calculated for $C_{28}H_{28}I_6N_4O_8H_2O$. The compound was further identified by elementary analysis after drying in a vacuum for 3 hours at 110° C. to remove the crystal water:

Calculated for $C_{28}H_{28}I_6N_4O_8$: 25.67% C; 58.13% I. Found: 25.63% C; 58.22% I.

The thin layer chromatogram on silica gel gave an $R_f$ value of 0.44 with isobutanol/isopropanol/ammonia 5:2:3. Its solubility and the solubilities of its sodium and N-methylglucamine salts are as those of Compound A and of the salts of the latter.

EXAMPLE 3

Azelaic acid bis-(3-acetylaminomethyl-5-carboxy-2,4,6-triiodoanilide)

As in Examples 1 and 2, Compound C was prepared from 23.45 g. 5-amino-3-acetylaminomethyl-2,4,6-triiodobenzoic acid in 40 ml. dimethylacetamide and 5.4 g. azelayl dichloride (nonanedioyl dichloride) in three hours at 95° C. in an amount of 15.9 g. (60% yield). M.P. 205°–210° C. for the dihydrate which has a calculated equivalent weight of 680 also found by experiment. The compound was further identified by microanalysis in the anhydrous form:

Calculated for $C_{29}H_{30}I_6N_4O_8$: 26.30% C; 57.51% I. Found: 26.12% C; 57.28% I.

An $R_f$ value of 0.60 was found in a thin layer chromatogram under the conditions of Example 1.

The free acid C is insoluble in water and chloroform, only sparingly soluble in cold methanol and ethanol, slightly soluble in boiling ethanol (2.5%). The sodium and N-methylglucamine salts are as soluble as those of Compounds A and B.

EXAMPLE 4

Sebacic acid bis-(3-acetylaminomethyl-5-carboxy-2,4,6-triiodoanilide)

Compound D was produced in an amount of 22.2 g. (83.5% yield) when 23.45 g. 5-amino-3-acetylaminomethyl-2,4,6-triiodobenzoic acid was reacted in 40 ml. dimethylacetamide with 5.5 g. sebacyl dichloride (decanedioyl dichloride) for three hours at 95° C.

When recrystallized from ethanol and dried to constant weight at 100° C. in a vacuum, the compound sinters at 205° C. and melts at 247° to 250° C. It was identified by its equivalent weight (eq. wt.) and elementary analysis:

Calculated for $C_{30}H_{32}I_6N_4O_8$: Eq. wt. 679; 26.93% C; 56.91% I. Found: Eq.wt. 684; 26.78% C; 56:62% I.

EXAMPLE 5

Adipic acid bis-(3-acetylaminomethyl-5-carboxy-2,4,6-triiodoanilide)

When 23.45 g. 5-amino-3-acetylaminomethyl-2,4,6-triiodobenzoic acid were reacted with 4.4 g. adipyl dichloride (hexanedioyl dichloride) in 45 ml. dimethylacetamide at 95° C. for three hours as described in Example 1, and the crude compound was purified by conversion to the cyclohexylamine salt and decomposition of the latter, the subject compound was obtained in an amount of 14.4 g. (56% yield). M.P. 247°–250° C.

The compound was identified by its equivalent weight of 650 as the monohydrate $C_{26}H_{24}I_6N_4O_8 \cdot H_2O$. The anhydride was prepared as described above and identified by microanalysis:

Calculated for $C_{26}H_{24}I_6N_4O_8$: 24.36% C; 59.50% I. Found: 24.21% C; 59.10% I.

The thin layer chromatogram gave an $R_f$ value of 0.52 with butanol/acetic acid/water 3:2:1. The free acid is insoluble in water and chloroform, has a solubility of about 1% in cold methanol and ethanol, and a solubility of about 3% in boiling methanol or ethanol. The sodium and N-methylglucamine salts are soluble in about equal weights of water at 20° C.

EXAMPLE 6

2-methyladipic acid bis-(3-acetylaminomethyl-5-carboxy-2,4,6-triiodoanilide)

Compound O was prepared by the method of Example 1 from 7 g. 5-amino-3-acetylaminomethyl-2,4,6-triiodobenzoic acid in 10 ml. dimethylacetamide and 1.3 g. 2-methyladipyl dichloride in an amount of 2.8 g. It melts with decomposition at 237° C. Its equivalent weight was found to be 657.2 (calculated for $C_{27}H_{26}I_6N_4O_8 \cdot H_2O$: 657). An analysis value of 58.48% I agreed well with the 58.76% I calculated for $C_{27}H_{26}I_6N_4O_8$. An $R_f$ value of 0.24 was obtained on silica gel with isobutanol/isopropanol/ammonia 5:3:2. The free acid is insoluble in water, chloroform, and ethanol, and has a solubility of about 5% in boiling methanol. The sodium and N-methylglucamine salts are freely soluble in water at 20° C. (abt. 100 g./dl).

EXAMPLE 7

4,7-dioxadecane-1,10-dioic acid bis-(3-acetylaminomethyl-5-carboxy-2,4,6-triiodoanilide)

5.85 g. 4,7 - dioxadecane - 1,10 - dicarboxyl dichloride, when reacted with 23.45 g. 5-amino-3-acetylaminomethyl-2,4,6-triiodobenzoic acid in 40 ml. dimethylacetamide for 3 hours at 95° C. yielded crude Compound P. When recrystallized from 200 ml. 50% ethanol, 7.6 g. of the pure compound having a melting point of 230°–235° C. were obtained. Compound P was identified by elementary analysis:

Calculated for $C_{28}H_{28}I_6N_4O_{10}$: 25.06% C; 56.74% I. Found: 24.96% C; 56.49% I.

$R_f$ in a thin layer chromatogram prepared as in Example 1 was 0.37. The free acid is insoluble in water and chloroform, readily soluble in cold methanol (15%) and ethanol (10%), and dissolves in boiling methanol or ethanol in an amount of 30 g./dl. The sodium and N-glucamine salts are freely soluble in water at 20° C.

The 4,7-dioxadecane-1,10-dioyl dichloride was prepared by holding a mixture of 48.5 g. 4,7-dioxadecane-1,10-dioic acid and 70 ml. thionyl chloride at elevated temperature. B.P. 155°–160° C. at 3 mm. Hg.

EXAMPLE 8

4,7,10-trioxatridecane-1,13-dioic acid bis-(3-acetylaminomethyl-5-carboxy-2,4,6-triiodoanilide)

Compound Q was obtained in a manner analogous to the procedure of Example 1 by holding 17.7 g. 5- amino-3-acetylaminomethyl-2,4,6-triiodobenzoic acid and 5.2 g. 4,7,10-trioxatridecane-1,1,3-dioyl dichloride in 20 ml. dimethylacetamide at 75° C. for three hours. The crude product precipitated from the reaction mixture by means of hot water was purified by dissolution in sodium hydroxide and reprecipitation with hydrochloric acid, recrystallization from isopropanol, and ultimately by precipitation from its solution in sodium bicarbonate with dilute hydrochloric acid.

Compound Q sinters at 180° C. and melts at 186° C. Its equivalent weight was found as 693 as compared to a value of 694 calculated for $C_{30}H_{32}I_6N_4O_{11}$. The compound was further identified by microanalysis:

Calculated: 25.99% C; 54.94% I. Found: 25.94% C; 54.80% I.

A thin layer chromatogram on silica gel gave an $R_f$ value of 0.33 with butanol/acetic acid/water 3:2:1.

Compound Q is practically insoluble in water, ethyl acetate, and chloroform, but readily soluble in lower alkanols. The sodium and N-methylglucamine salts dissolve in cold water.

The 4,7,10-trioxatridecane-1,13-dioyl dichloride employed as a starting material was prepared from the known corresponding dicarboxylic acid by means of an excess of thionyl chloride as in Example 7.

EXAMPLE 9

4,7,10,13-tetraoxahexadecane-1,16-dioic acid bis(3-acetylaminomethyl-5-carboxy-2,4,6-triiodoanilide)

8 g. 4,7,10,13-tetraoxahexadecane-1,16-dioyl dichloride where added to a solution of 23.5 g. 5-amino-3-acetylaminomethyl-2,4,6-triiodobenzoic acid in 40 ml. dimethylacetamide at 95° C. over a period of 20 minutes, and the mixture was stirred for three hours while the temperature was held at 95°–100° C. It was then cooled to ambient temperature and poured into 300 ml. water. The precipitated crude Compound K was dissolved in dilute sodium hydroxide solution, the solution was stirred with 2 g. active carbon, filtered, and run into very dilute hydrochloric acid in a thin stream.

15.5 g. Crude Compound K (54% yield) having a melting point of 165° C. and an equivalent weight of 722 were recovered and further purified by recrystallization from isopropanol and reprecipitation from the sodium bicarbonate solution with dilute hydrochloric acid. The pure compound melted at 175° C. It was identified by the equivalent weight of 724 as the monohydrate (calculated for ½ $C_{32}H_{36}I_6N_4O_{12} \cdot O_2$: 724). Analysis after drying at 120° C. gave the following values:

Calculated for $C_{32}H_{36}I_6N_4O_{12}$: 26.87% C; 53.25% I. Found: 26.85% C; 53.10% I.

$R_f$ on silica gel with butanol/glacial acetic acid/water 3:2:1 was 0.36. The acid is insoluble in water, chloroform, and ethyl acetate, readily soluble in lower alkanols. The sodium and N-methylglucamine salts dissolve in water at 20° C. at a rate of at least 100 g./dl.

The 4,7,10,13-tetraoxahexadecane-1,16-dioyl dichloride was prepared by the following sequence of steps from the known 1,14-dicyano-3,6,9,12-tetraoxatetradecane (U.S. Pat. No. 2,401,607): 148.5 grams of the dinitrile were added to a solution of 232 g. concentrated sulfuric acid (2.45 mole) in 290 ml. absolute ethanol at 15° C., and the mixture was refluxed for 15 hours with agitation. It was then cooled and poured over a mixture of 1000 g. ice and 250 g. ammonium sulfate.

The diethyl 4,7,10,13-tetraoxahexadecane-1,16-dioate so formed was extracted from the aqueous mixture with methylene chloride, and was recovered from the dried extract by evaporation of the solvent and distillation of the residue as a fraction boiling at 190° to 195° C. at 0.005 mm. Hg.

97 grams of the ester so prepared were dissolved in 200 ml. water and mixed with a solution of 24.4 g. sodium hydroxide in 50 ml. water, and the hydrolysis mixture was heated on a steam bath for 90 minutes. It was then cooled to room temperature and extracted with ether. The aqueous phase was evaporated to dryness, and the residue washed with acetone. It consisted of 107 g. disodium 4,7,10,13-tetraoxahexadecane-1,16-dioic acid of 87.8% purity having a melting point of 102°–104° C. The salt was taken up in about 300 ml. water and converted to the free dicarboxylic acid by addition of the calculated equivalent amount of hydrochloric acid and evaporation of the water present. The residue was taken up in acetone, and the insoluble sodium chloride was removed by filtration. The filtrate was evaporated to remove the solvent and extracted with diethyl ether. The ether extract was dried and evaporated to yield 56 g. liquid 4,7,10,13-tetraoxahexadecane-1,16-dioic acid (68% yield).

The acid was identified by its equivalent weight of 149.5 (calulated: 147.2) and was converted to the dichloride by cautious mixing with about 100 ml. thionyl chloride and heating of the mixture to 40° to 50° C. The reaction mixture was filtered, and the clear filtrate was evaporated in a vacuum to remove the residual thionyl chloride. The desired dichloride was obtained as a non-volatile residue.

EXAMPLE 10

Sebacic acid bis-(3-propionylaminomethyl-5-carboxy-2,4,6-triiodoanilide)

11.6 g. (0.048 mole) sebacyl dichloride were added over a period of ten minutes to 48 g. (0.08 mole) 5-amino-3-propionylaminomethyl-2,4,6-triiodobenzoic acid in 90 ml. dimethylacetamide, and the mixture was kept at 95° C. for three hours with agitation, cooled, and poured into 800 ml. water. The precipitate formed was filtered off, washed with water, dissolved in dilute sodium hydroxide solution, and reprecipitated with dilute hydrochloric acid.

Compound H was recovered in an amount of 52.8 g. (95% yield), had a melting point of 164°–174° C., and an equivalent weight of 706. When purified by conversion to the cyclohexylamine salt and decomposition of the salt, as described in Example 1, or by suspending the crude acid in a little methanol and subsequently reprecipitating it from its sodium hydroxide solution with hydrochloric acid, had a melting point of 205°–210° C., and an equivalent weight of 697 as compared to a value of 701 calculated for ½$C_{32}H_{36}I_6N_4O_8 \cdot 2H_2O$. It was further identified by elementary analysis after drying at 110° C. and 0.2 mm. Hg for five hours:

Calculated for $C_{32}H_{36}I_6N_4O_8$: 28.13% C; 55.73% I. Found: 28.50% C; 55.08% I.

A thin layer chromatogram on silica gel gave an $R_f$ value of 0.69 (butanol/glacial acetic acid/water 3:2:1). The free acid is insoluble in water and chloroform, slightly soluble in cold ethanol, soluble in cold methanol and boiling ethanol, and readily soluble in boiling methanol. The sodium and N-methyglucamine salts dissolve in water at 20° C. at a rate of approximately 100 g./dl.

EXAMPLE 11

Azelaic acid bis-(3-propionylaminomethyl-5-carboxy-2,4,6-triiodoanalide)

Compound G was prepared by the methods of Examples 1 and 10 from 39 g. 5-amino-3-propionylaminomethyl-2,4,6-triiodobenzoic acid in 70 ml. dimethylacetamide and 8.8 g. azelayl dichloride in three hours at 95° C. The crude compound was obtained in an amount of 41.7 g. (95% yield) and was purified by way of the cyclohexylamine salt. Pure Compound G was ultimately obtained in an amount of 20.1 g. It sintered at 195° C., and melted at 207°–210° C. It was identified by analysis:

Calculated for $C_{31}H_{34}I_6N_4O_8$: Eq. wt. 676; 27.54% C; 56.32% I. Found: Eq. wt. 670; 27.46% C; 56.12% I.

A single spot at $R_f$ 0.21 was found in a thin layer chromatogram on silica gel with isobutanol/isopropanol/ammonia 5:3:2.

The acid is insoluble in water and chloroform, sparingly soluble in cold ethanol, soluble in cold methanol and hot ethanol, and readily soluble in hot methanol. The sodium and N-methyglucamine salts dissolve in equal weights of water at 20° C.

EXAMPLE 12

Suberic acid bis-(3-propionylaminomethyl-5-carboxy-2,4,6-triiodoanilide)

As in Examples 1, 10, and 11, Compound F was prepared from 48 g. 5-amino-3-propionylaminomethyl-2,4,6-triiodobenzoic acid in 90 ml. dimethylacetamide and 10.15 g. suberyl dichloride (3 hours at 95° C.) in an initial amount of 49.9 g. (93% yield). When purified by way of the cyclohexylamine salt, the compound had a melting point of 210°–213° C., an equivalent weight of 665 as compared to a calculated value of 669, and gave an $R_f$ value of 0.23 on silica gel with isobutanol/isopropanol/ammonia 5:3:2. The compound was further identified by analysis:

Calculated for $C_{30}H_{32}I_6N_4O_8$: 26.93% C; 56.91% I. Found: 26.87% C; 56.75% I.

It is insoluble in water, chloroform, and sesame oil, sparingly soluble in cold ethanol, soluble in cold methanol and boiling ethanol, and readily soluble in boiling methanol. The sodium and N-methylglucamine salts are freely soluble in water at 20° C.

EXAMPLE 13

Pimelic acid bis-(2-propionylaminomethyl-5-carboxy-2,4,6-triiodoanilide)

Following the procedure of the preceding examples, 48 g. 5 - amino-3-propionylaminomethyl-2,4,6-triiodobenzoic acid in 90 ml. dimethylacetamide and 9.5 g. pimelyl dichloride were reacted at 95° C. for the three hours to produce 40.4 g. Compound E (76% yield) which was purified by way of the cyclohexylamine salt and had the following properties:

M.P. 213°–216° C. Equivalent weight 662 (calculated 661 for $C_{29}H_{30}I_6N_4O_8$). $R_f=0.31$ (silica gel, isobutanol/isopropanol/ammonia 5:3:2).

It is insoluble in water and chloroform, only sparingly soluble in methanol and ethanol. The sodium and N-methyl glucamine salts are soluble in equal weights of water at 20° C. The acid was identified by elementary analysis:

Calculated for $C_{29}H_{30}L_6N_4O_8$: 26.30% C; 57.51% I. Found: 26.20% C; 57.28% I.

EXAMPLE 14

Adipic acid bis-(3-propionylaminomethyl-5-carboxy 2,4,6-triiodoanilide)

As in the preceding examples, the adjacent higher homolog of the compound described in Example 5 was prepared from 48 g. 5-amino-3-propionylaminomethyl-2,4,6-triiodobenzoic acid in 9 ml. dimethylacetamide and 8.8 g. adipyl dichloride in an amount of 46 g. of the crude product (88% yield). It was purified by conversion to the cyclohexylamine salt and decomposition of the salt, and the pure compound had the following properties: M.P. 228°–232° C. (decomp.). Equivalent weight 652 (calculated: 655). $R_f=0.15$ (silica gel, isobutanol/isopropanol/ammonia 5:3:2).

It is insoluble in water and chloroform, sparingly soluble in cold ethanol, soluble in cold methanol and hot ethanol, readily soluble in hot methanol. The sodium and N-methylglucamine salts dissolve in equal weights of water at 20° C. The acid was identified by elementary analysis:

Calculated for $C_{28}H_{28}I_6N_4O_8$: 25.67% C; 58.13% I. Found: 25.57% C; 57.92% I.

EXAMPLE 15

4,8-dioxaundecane-1,11-dioic acid bis-(3-propionylaminomethyl-2,4,6-triiodoanilide)

The subject compound was prepared in a manner evident from the preceding examples from 24 g. 5-amino-3-propionylaminomethyl-2,4,6-triiodobenzoic acid in 60 ml. dimethylacetamide and 6.2 g. 4,8-dioxaundecane-1,11-dioyl dichloride at 90° C. in 3.5 hours and was purified by reprecipitation from the sodium hydroxide solution with hydrochloric acid and recrystallization from 50% ethanol. The purified compound had a melting point of 198° to 203° C., an equivalent weight of 706, as compared to a value of 710 calculated for $\frac{1}{2}C_{31}H_{34}I_6N_4O_{10} \cdot 2H_2O$ and gave a single spot on the thin layer chromatogram at $R_f=0.49$ (silica gel, butanol/glacial acetic acid/water 3:2:1).

It is insoluble in water and chloroform, sparingly soluble in cold ethanol, readily soluble in cold methanol, and very easily soluble in boiling methanol and ethanol. The solubility of the sodium and N-methylglucamate salts in water at 20° C. is near 100 g./dl.

The acid was identified by microanalysis after drying at 120° C.:

Calculated for $C_{31}H_{34}I_6N_4O_{10}$: 26.90% C; 55.02% I. Found: 26.85% C; 54.92% I.

The 4,8-dioxaundecane-1,11-dioyl dichloride is readily obtained by heating 15.4 g. 4,8-dioxaundecane-1,11-dioic acid with 20 ml. thionyl chloride to 55°–75° C. and boils at 125°–128° C. at 0.005 mm. Hg. The yield is 15 g. (90.5%). The last mentioned dicarboxylic acid is known (Hixon, J.A.C.S. 70 (1948) 1333–1334).

EXAMPLE 16

4,8-dioxaundecane-1,11-dioic acid bis-(3-acetylaminomethyl-2,4,6-triiodoanilide)

29.3 g. 5-amino-3-acetylaminomethyl-2,4,6-triiodobenzoic acid were dissolved in 70 ml. dimethylacetamide, and the solution was mixed with 7.1 g. 4,8-dioxaundecane-1,11-dioyl dichloride. The mixture was held at 95° C. for three hours, and was then stirred into 700 ml. water. The precipitate formed thereby was dissolved in dilute sodium hydroxide solution, and the alkaline solution was added in a thin stream to an excess of dilute hydrochloric acid at 60° C. The reprecipitated subject compound was recovered (21 g., 62% yield), and recrystallized from 95% ethanol. It melted at 235°–240° C.

When again purified by dissolution in sodium hydroxide solution and precipitated by means of hydrochloric acid, the compound had a melting point of 205° to 210° C., an equivalent weight of 678 (calculated: 680), and an $R_f$ value of 0.21 (thin layer on silica gel, isopropanol/isobutanol/ammonia 5:3:2). It was identified by its elementary analysis.

Calculated for $C_{29}H_{30}I_6N_4O_{10}$: 25.68% C, 56.15% I. Found: 25.64% C; 56.08% I.

The free acid is practically insoluble in water and chloroform, but readily dissolves in methanol and ethanol. The sodium and N-methylglucamine salts dissolve in equal weights of water at 20° C.

EXAMPLE 17

Pimelic acid bis(3-butyrylaminomethyl-5-carboxy-2,4,6-triiodoanilide

Compound I was prepared from 43 g. (0.07 mole) 5-amino-3-butyrylaminomethyl-2,4,6-triiodobenzoic acid in 90 ml. dimethylacetamide to which 8.25 g. (0.042 mole) pimelyl dichloride were added drop by drop over a period of ten minutes. The reaction mixture was stirred 3.5 hours at 95° C. and worked up as described in Example 1.

Compound I was recovered in an amount of 29.7 g. (62.5% yield). It sintered at 200° C., and melted at 210°–215° C. Its equivalent weight was found at 676 as calculated and its $R_f$ value 0.67 (thin layer chromatogram on silica gel, butanol/glacial acetic acid/water 3:2:1). It was identified by microanalysis:

Calculated for $C_{31}H_{34}I_6N_4O_8$: 27.54% C; 56.32% I. Found: 27.55% C; 56.28% I.

The acid is practically insoluble in water and chloroform, slightly soluble in cold ethanol, soluble in cold methanol, and readily soluble in boiling methanol and ethanol. The sodium and N-methylglucamine slats dissolve in equal weights of water at 20° C.

EXAMPLE 18

The procedure of Example 17 was followed in preparing bis-(3-butyrylaminomethyl-5-carboxy-2,4,6-triiodoanilides) of other dicarboxylic acids. These acids are listed in the following Table IV together with the melting points and $R_f$ values of the anilide derivatives. The thin layer chromatograms were made on silica gel with a solvent system of isopropanol/isobutanol/ammonia 5:3:2 for Compounds S, T, and U, and butanol/glacial acetic acid/water 3:2:1 for Compound V. Each compound was identified by elementary analysis and equivalent weight and is insoluble or practically insoluble in water and chloroform and soluble in boiling methanol. The Compounds S, T, U, V, differ somewhat from each other in their solubilities in ethanol and in cold methanol. Their sodium and N-glucamine salts are readily soluble in equal weights of water at 20° C.

TABLE IV

| Compound: | Acid | M.P., °C. | $R_f$ |
|---|---|---|---|
| S | Suberic [1] | 205–208 | 0.45 |
| T | Azelaic [2] | 210–213 | 0.58 |
| U | Sebacic | 185–188 | 0.55 |
| V | Adipic [3] | 220–223 | 0.63 |

[1] Sinters at 195.
[2] Sinters at 190.
[3] Sinters at 205.

The radiopaque acids prepared as described in Examples 1–18 were converted to the soluble sodium, lithium, calcium and magnesium salts, also to the water soluble salts with physiologically acceptable organic bases, particularly the alkanolamines, in a conventional manner, and solutions of the salts containing 140 to 380 mg. iodine per milliliter have been used successfully for cholecystography in humans and other warm-blooded animals. The following examples are merely illustrative of injectable compositions of the invention.

EXAMPLE 19

A solution was prepared to the following prescription:

| | G. |
|---|---|
| Azelaic acid bis-(3-acetylaminomethyl - 5 - carboxy-2,4,6-triiodoanilide) | 521 |
| N-methylglucamine | 136.7 |
| Sodium hydroxide | 2.66 |
| Disodium edetate | 0.01 |
| Bidistilled water to make 1,000 ml. | |

The disodium edetate was dissolved first in a little water, and the other solid ingredients were added in the order listed. The mixture was stirred until a solution was obtained which was diluted with the remainder of the water, adjusted to pH 7.1±0.2, subjected to ultrafiltration, transferred to 10 ml. and 20 ml. glass vials, and sterilized in the vials as is conventional. The iodine content of the solution was 300 mg. per milliliter. For cholecystography in humans, 2 to 6 g. iodine, usually about 3 g. are necessary.

EXAMPLE 20

A more dilute solution for parenteral application was prepared as described in Example 19 according to the following prescription:

| | G. |
|---|---|
| Sebacic acid bis-(3-propionylaminomethyl - 5 - carboxy-2,4,6-triiodoanilide) | 275 |
| N-methylglucamine | 58.5 |
| Sodium hydroxide | 3.67 |
| Sodium edetate | 0.01 |
| Bidistilled water to make 1000 ml. | |

The injectable solution so prepared was transferred to 20 ml. vials and to bottles of 100 and 200 ml. capacity, sterilized, and used as indicated above. It contained 150 mg. iodine per ml.

What is claimed is:

1. A radiopaque compound which is a 3-acylaminomethyl - 5 - carboxy - 2,4,6 - triiodoanilide of a dicarboxylic acid and has the formula

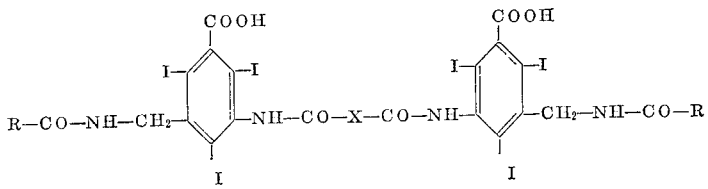

wherein X is alkylene or polyoxaalkylene having 4 to 10 carbon atoms and R is lower alkyl, or a water-soluble, physiologically tolerated salt of said 3-acylaminomethyl-5 - carboxy - 2,4,6 - triidonoanilide with a metal or an amine.

2. A compound as set forth in claim 1, wherein R is methyl or ethyl.

3. A compound as set forth in claim 2, wherein X is alkylene having 4 to 8 carbon atoms.

4. A compound as set forth in claim 2, wherein X is n-hexylene.

5. A compound as set forth in claim 2, wherein X is n-heptylene.

6. A compound as set forth in claim 2, wherein X is n-octylene.

7. A compound as set forth in claim 2, wherein X is 1-methylbutylene.

8. A compound as set forth in claim 2, wherein X is polyoxaalkylene of the formula $$-C_2H_4-(O-C_mH_{2m})_n-$$

$n$ being an integer between 2 and 4, and $m$ being 2 or 3.

9. A compound as set forth in claim 8, wherein $n$ is 4 and $m$ is 2.

10. A compound as set forth in claim 8, wherein $n$ is 3 and $m$ is 2.

11. A compound as set forth in claim 8, wherein $n$ is 2 and $m$ is 2.

12. A compound as set forth in claim 1, wherein X is n-pentylene.

References Cited

UNITED STATES PATENTS 3,306,927   2/1927   Larsen _____ 260—518

LORRAINE A. WEINBERGER, Primary Examiner

L. A. THAXTON, Assistant Examiner

U.S. Cl. X.R.

260—247.2, 501.11, 518; 424—5